United States Patent [19]

Baklanov et al.

[11] 3,947,262

[45] Mar. 30, 1976

[54] METHOD OF PRODUCING PHOSPHORUS-CONTAINING FERTILIZERS

[76] Inventors: Nikolai Mikhailovich Baklanov, 3 Parkovaya ulitsa, 48, korpus 2, kv. 54, Moscow; Ljubov Pavlovna Buslakova, Voskresensk, ulitsa Pobedy, 21, kv. 55, Moskovskaya oblast; Raisa Mikhailovna Nekorystnova, Voskresensk, ulitsa Mendeleeva, 14, kv. 64, Moskovskaya oblast; Anatoly Artemievich Novikov, Voskresensk, ulitsa Meditsinskaya, 18, Moskovskaya oblast; Tatyana Grigorievna Repenkova, Voskresensk, ulitsa Pobedy, 20, kv. 11, Moskovskaya oblast; Ivan Ivanovich Rumyantsev, 4 ulitsa 8 Marta, 4, korpus 2, kv. 135; Galina Alexandrovna Sapogova, Leningradsky prospekt, 57, kv. 110a, both of Moscow; Nikolai Pavlovich Solodovnik, Voskresensk, ulitsa Pobedy 20, kv. 5, Moskovskaya oblast; Viktor Mironovich Fridman, Karetny ryad, 5/10, kv. 180, Moscow, all of U.S.S.R.

[22] Filed: July 27, 1973

[21] Appl. No.: 383,457

[52] U.S. Cl. ............................ 71/37; 71/40; 71/41; 423/319; 423/320
[51] Int. Cl.$^2$ C05B 11/04; C05B 11/08; C01B 25/16
[58] Field of Search ............ 71/37, 40, 41; 423/319, 423/320; 259/DIG. 44

[56] References Cited

UNITED STATES PATENTS

| | | | |
|---|---|---|---|
| 2,489,768 | 11/1949 | Firth | 259/DIG. 44 |
| 2,578,377 | 12/1951 | Smith | 259/DIG. 44 |
| 3,161,466 | 12/1964 | Fallin | 71/37 X |
| 3,165,299 | 1/1965 | Balamuth et al. | 259/DIG. 44 |
| 3,169,013 | 2/1965 | Jones | 259/DIG. 44 |
| 3,507,641 | 4/1970 | Richmond et al. | 71/37 |
| 3,636,859 | 1/1972 | Null | 259/DIG. 44 |

*Primary Examiner*—Charles N. Hart
*Assistant Examiner*—Ferris H. Lander

[57] ABSTRACT

A method of producing phosphorus-containing fertilizers, wherein the phosphate raw stock is treated with a mineral acid selected from the group, consisting of phosphoric acid, sulphuric acid and a mixture of both. The thus-obtained suspension of the phosphorus-containing fertilizers is acted upon by acoustic vibrations at a frequency of from 500 to 20,000 Hz and a second energy density of from 0.5 to 5 W/cm$^2$, whereupon the end product is isolated.

1 Claim, No Drawings

METHOD OF PRODUCING PHOSPHORUS-CONTAINING FERTILIZERS

The present invention relates to a method of producing phosphorus-containing fertilizers.

Known in the art are some methods of producing phosphorus-containing fertilizers, viz., continuous and batch-type methods of producing double superphosphate or common superphosphate, producing extraction phosphoric acid by way of treating the phosphate raw stock with phosphoric and/or sulphuric acid in stirrer-fitted reaction vessels to obtain a suspension of phosphorus-containing fertilizers and isolate the end products (cf. "Superphosphate"; "Chemical Age of India," 1970, No. 1, v. 21, pp. 957–961).

A disadvantage inherent in the afore-discussed methods resides in the low-intensity turbulent agitation which substantially affects the rate of decomposition of the phosphate raw stock, prevents the use of the rough-ground phosphate raw stock and involves the use of cumbersome and expensive grinding equipment to disintegrate the phosphate raw stock.

It is therefore an essential object of the present invention to improve a method of producing phosphorus-containing fertilizers, wherein an additional decomposition of the phosphate raw stock at the stage of preparing the suspension is ensured.

It is another object of the present invention to enable the use of a coarser-ground phosphate raw stock.

Said object is accomplished by the fact that, according to the invention the thus-obtained suspension is acted upon by acoustic vibrations at a frequency of from 500 to 20,000 Hz and a sound energy density of from 0.5 to 5 $W/cm^2$, whereafter the end product is isolated.

When applied to the production of double superphosphate the proposed method, due to treatment of the suspension by acoustic vibrations at a frequency of from 500 to 20,000 Hz and a sound energy density of from 0.5 to 5 $W/cm^2$, contributes to the removal of the dicalciumphosphate films from the granules of the phosphate raw stock and increases the interphase surface of the latter, whereby the diffusion of the ions $H^+$ and $Ca^{++}$ is substantially improved. Besides, acoustic treatment of said suspension enables the use of a coarser-ground phosphate raw stock (with a plus-material percentage of from 0.15 to 20) without its having been preliminarily disintegrated. The result is a 15-percent increase in the degree of decomposition of the phosphate raw stock at the suspension preparing stage and a 10-percent increase of same in the end product.

The use of acoustic vibrations at the suspension preparing stage in the production of extraction phosphoric acid ensures a uniform growth of the calcium-phosphate crystals which are readily filtered and washed.

The proposed method of producing phosphorus-containing fertilisers is carried into effect preferably as follows.

The preliminarily disintegrated phosphate raw stock is fed, by means of an automatic batchmeter, into a pass-through acoustic hydrodynamic mixer, into which through an orifice-plate proportioner is also fed a mineral acid. Said components are subjected in the pass-through acoustic mixer to a highly effective treatment with acoustic vibrations. Further treatment of the resultant suspensions accurs in one or two reaction vessels provided with submerged-type acoustic hydrodynamic mixers featuring a vibration frequency range from 500 to 20,000 Hz and a sound energy density from 0.5 to 5 $W/cm^2$.

The rotary-type acoustic hydrodynamic mixer consists of an electric drive, a bearing unit, a sealing unit, and a rotary-type acoustical radiator. When in the acoustic mixer, the materials under treatment pass through the slits and slots of the revolving rotor and stationary stator of the radiator, wherein they are subjected to a vigorous acoustic treatment under the conditions of a developed hydrodynamic flow and active cavitation. The result is that high tangential forces arise in the liquid which are liable to break the flow of liquid and thus grind included solids.

The process of decomposing the phosphate raw stock in the reactor vessel with the submerged-type acoustic mixer takes one hour.

Further on, the suspension is treated by conventional methods to obtain the end product.

To promote understanding, given below are a number examples to illustrate the methods of producing phosphorus-containing fertilizers according to the present invention.

EXAMPLE I

In the production of double superphosphate, decomposition of phosphorites with the percentage of particles sizing over 180 mcm equal to about 10.6 and that of particles sizing 63 mcm, to about 38.4 is carried out by extraction phosphoric acid in a reaction vessel accommodating a source of acoustic vibrations with frequency range of from 500 to 20,000 Hz and sound energy density of from 0.5 to 5 $W/cm^2$. The extraction phosphoric acid with a $P_2O_5$ concentration of 30 percent and phosphorites are proportioned into the reaction vessel through a pass-through acoustic apparatus, the total volume of the contents being about 1 cu.m and the specified amount of phosphoric acid 808 parts by weight (as $P_2O_5$).

Duration of the treatment in the reaction vessel is one hour.

The decomposition percentage of phosphorites is calculated by analyzing the end product.

The end product obtained has a phosphorite decomposition percentage from 85 to 95.

EXAMPLE II

In the production of standard superphosphate, decomposition of the phosphate raw stock with sulphuric acid occurs in a reaction vessel accommodating a source of acoustic vibrations with a frequency range of from 500 to 20,000 Hz and sound energy density of from 0.5 to 5 $W/cm^2$. The concentrated sulphuric acid (60 to 70 percent $H_2SO_4$) and the phosphorites are proportionated into a reaction vessel provided with a submerged-type acoustic mixer. The specified amount of sulphuric acid is 680 parts by weight, the period of treatment in the reaction vessel is about 1 min. The phosphorite decomposition percentage is calculated through analyzing the end product.

The phosphorite decomposition percentage in the end product is about 90 to 95.

EXAMPLE III

In the production of extraction phosphoric acid, decomposition of apatite by a mixture of sulphuric and returned phosphoric acid with a concentration of 76 percent $H_2SO_4$ and 32 percent $P_2O_5$, is carried out in a reaction vessel accommodating a submerged-type source of acoustic vibrations having a frequency range of from 500 to 20,000 Hz and sound energy density of from 0.5 to 5 W/cm$^2$.

The total volumetric capacity of the reaction vessel is 330 cu.m the suspension treatment time therein being 4 to 5 hours.

The apatite decomposition percentage is calculated on the basis of the analysis of the end product, this being equal to about 98.

Application of acoustic vibrations in the production of extraction phosphoric acid enables a uniform growth of the crystals of gypsum which are readily filterable and washable so that the yield of P$_2$O$_5$ in the end product is eventually increased.

What is claimed is:

1. A method of producing phosphorus-containing fertilizers, consisting in that the phosphate raw stock is treated with a mineral acid selected from the group, consisting of phosphoric acid, sulphuric acid and a mixture of both to obtain a suspension of the phosphorus-containing raw stock, said suspension being exposed to the effect of acoustic vibrations at a frequency of from 500 to 20,000 Hz and a sound energy density of from 0.5 to 5 W/cm$^2$, whereafter the end product is isolated.

* * * * *